United States Patent
Yoshioka

(10) Patent No.: US 6,655,364 B1
(45) Date of Patent: Dec. 2, 2003

(54) FUEL FEED DEVICE

(75) Inventor: Hiroshi Yoshioka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 43 days.

(21) Appl. No.: 10/110,536
(22) PCT Filed: Aug. 18, 2000
(86) PCT No.: PCT/JP00/05529
§ 371 (c)(1), (2), (4) Date: Apr. 15, 2002
(87) PCT Pub. No.: WO02/16754
PCT Pub. Date: Feb. 28, 2002

(51) Int. Cl.[7] ............................................... F02M 37/04
(52) U.S. Cl. ...................................... 123/509; 123/510
(58) Field of Search ................................ 123/509, 510, 123/511

(56) References Cited

U.S. PATENT DOCUMENTS 5,649,514 A * 7/1997 Okada et al. ............... 123/514
5,782,223 A * 7/1998 Yamashita et al. .......... 123/510
5,785,032 A * 7/1998 Yamashita et al. .......... 123/509
6,520,163 B2 * 2/2003 Yoshioka et al. ............ 123/510
2002/0185114 A1 * 12/2002 Chu et al. ................... 123/497

* cited by examiner

Primary Examiner—Thomas N. Moulis
(74) Attorney, Agent, or Firm—Sughrue Mion, PLLC

(57) ABSTRACT

A fuel supply system in which a fuel filter has a large filtration area is obtained without increasing an outer diameter of the fuel supply system and an outer diameter of a tank hole through which a pump module is inserted in a fuel tank. The fuel supply system comprises a fuel pump 5, a fuel pressure regulator 9 for regulating pressure of fuel, and a fuel filter 6 having a hollow cylindrical filter case 7 for filtering the fuel, and in which the filter case 7 has a holding hole 7a for holding the fuel pump, a center line CL1 of the holding hole is eccentric with respect to a center line CL2 of the filter case 7 by a predetermined distance M, and a first enlarged space portion S1 in which fuel system parts such as fuel pressure regulator 9 are accommodated is formed at a part surrounded by an outer circumferential portion of the fuel pump 5 and an outer circumferential portion of the filter case 7.

3 Claims, 3 Drawing Sheets

FUEL FEED DEVICE

TECHNICAL FIELD

The present invention relates to a fuel supply system that is installed in a fuel tank of a vehicle or the like for raising a pressure of a fuel and supplying the fuel to an injector injecting the fuel to an engine.

BACKGROUND ART

Hitherto, a system disclosed in the U.S. Pat. No. 5,392,750 is known as a fuel supply system for supplying fuel to an internal-combustion engine. Another fuel supply system as disclosed in the Japanese Utility Model Publication (unexamined) No. 109465/1992 is also known. In the construction of these fuel supply systems, a hollow cylindrical fuel filter is disposed on the outer circumference of a fuel pump, thus forming a fuel supply system.

However, in the construction disclosed in the U.S. Pat. No. 5,392,750 and the Japanese Utility model Publication (unexamined) No. 109465/1992, the hollow cylindrical fuel filter occupies the outer circumferential portion of the fuel pump. Accordingly, in order to form a pump module by uniting other fuel system parts, it is necessary for the fuel system parts to be mounted on further outside in radial direction or mounted in axial direction. Hence a problem exists in that volume of the entire pump module becomes large.

In the case of mounting the fuel system part on the outside in radial direction, the pump module becomes large in outer circumferential diameter. Hence another problem exists in that a tank hole through which the pump module is inserted in the fuel tank needs to be large in diameter.

A further system disclosed in the International Publication No. WO96/23966 is also known as a conventional fuel supply system. A still further system as disclosed in the Japanese Patent Publication (unexamined) No. 18932/1998is also known. In the construction of the fuel supply system disclosed in the No. WO96/23966, a C-shaped fuel filter is mounted on an outer circumferential portion of the fuel pump over approximately half of the circumference. Fuel system parts such as fuel level gauge are disposed in a space portion on the remaining side of the outer circumferential portion of the fuel pump where the fuel filter is not disposed, thus forming a the fuel supply system.

In the construction of the fuel supply system disclosed in the Japanese Patent Publication (unexamined) No. 18932/1998, a case for a fuel filter provided with a C-shaped filtration element inside thereof is D-shaped in section. Fuel system parts such as sensor for a fuel level gauge are disposed in the portion formed by cutting a cylindrical member, thus forming a fuel supply system.

However, in the construction of the fuel supply systems disclosed in both No. WO96/23966 and Japanese Patent Publication (unexamined) No. 18932/1998, since the filtration element of the fuel filter is C-shaped, a problem exists in that the area for filtering the fuel is small as compared with a system having a hollow cylindrical fuel filter.

The present invention was made to solve the above-discussed problems and has an object of obtaining a fuel supply system in which the filtration area of the fuel filter is increased without enlarging outer diameter of the fuel supply system and outer diameter of a tank hole through which a pump module is inserted in the fuel tank.

DISCLOSURE OF INVENTION

A fuel supply system according to the invention comprises a fuel pump installed in a fuel tank for raising a pressure of a fuel and supplying the fuel to an injector of an internal-combustion engine, a fuel pressure regulator for discharging a surplus of the fuel discharged from the fuel pump as a surplus fuel from a fuel passage into the fuel tank and regulating the pressure of the fuel, and a fuel filter having a hollow cylindrical filter case in which a filtration element for filtering the fuel discharged from the fuel pump is accommodated, wherein the filter case is provided with a holding hole for holding the fuel pump, a center line of the holding hole is formed eccentric with respect to a center line of the filter case by a predetermined distance, and a first enlarged space portion is formed at a part surrounded by an outer circumferential portion of the fuel pump and an outer circumferential portion of the filter case.

Fuel system parts such as fuel pressure regulator are accommodated in the first enlarged space portion.

A second enlarged space portion for accommodating a lead wire of a fuel level gauge is formed between an inner circumferential wall of the filter case and the outer circumferential portion of the fuel pump.

BEST MODE FOR CARRYING OUT THE INVENTION

Embodiment 1

The present invention is hereinafter described in more detail with reference to the accompanying drawings.

Figure 1:
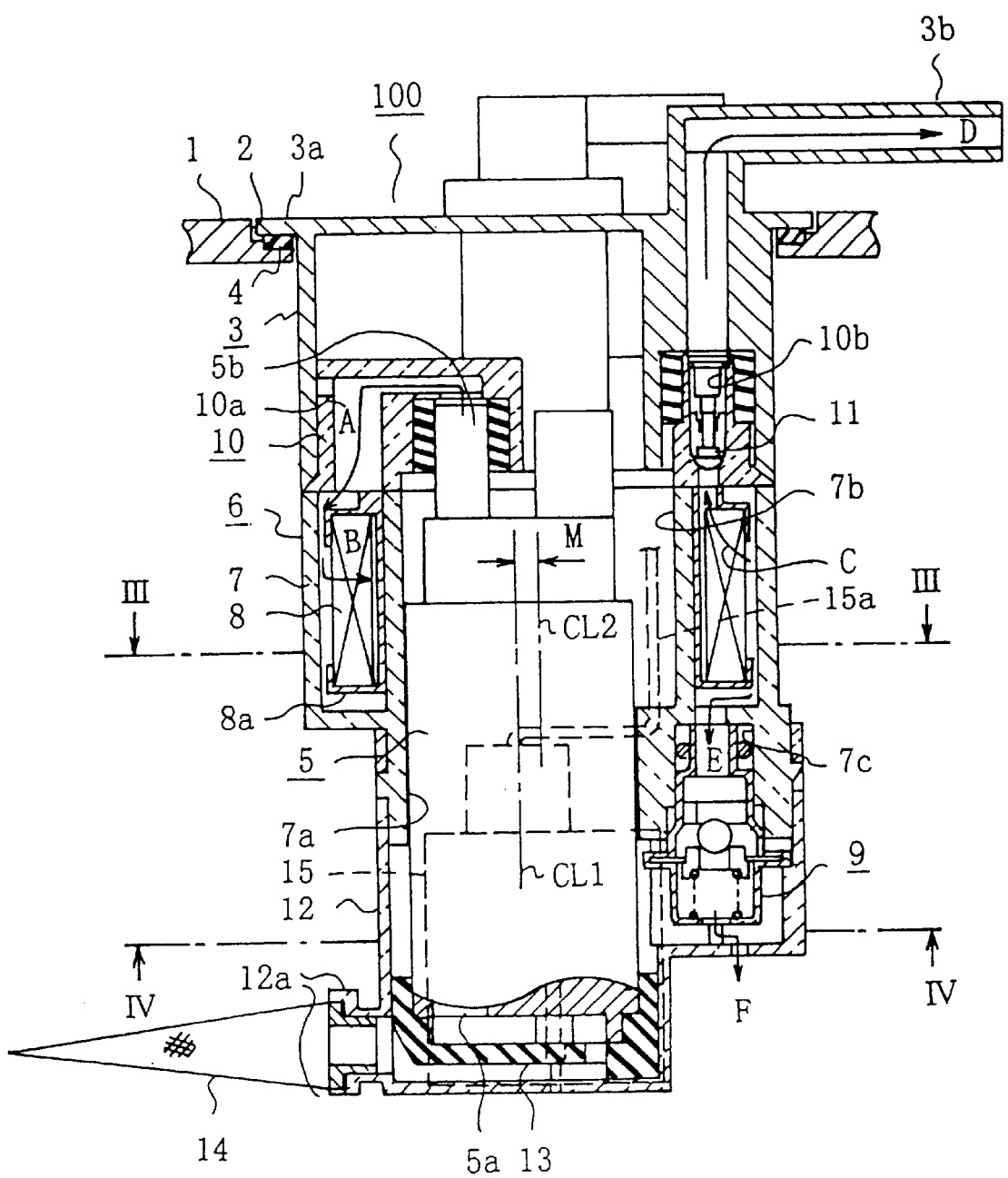
FIG. 1 is a sectional side view of a fuel supply system showing an embodiment of the invention.
Figure 2:
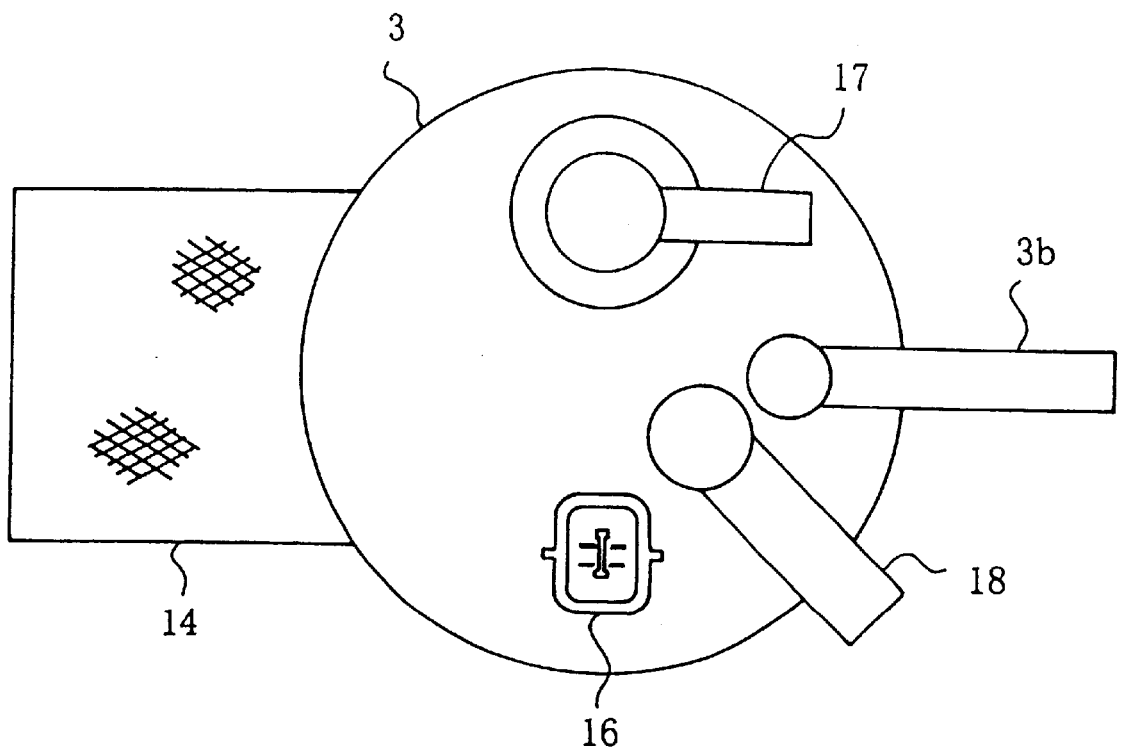
FIG. 2 is a plan view of the fuel supply system in FIG. 1.
Figure 3:
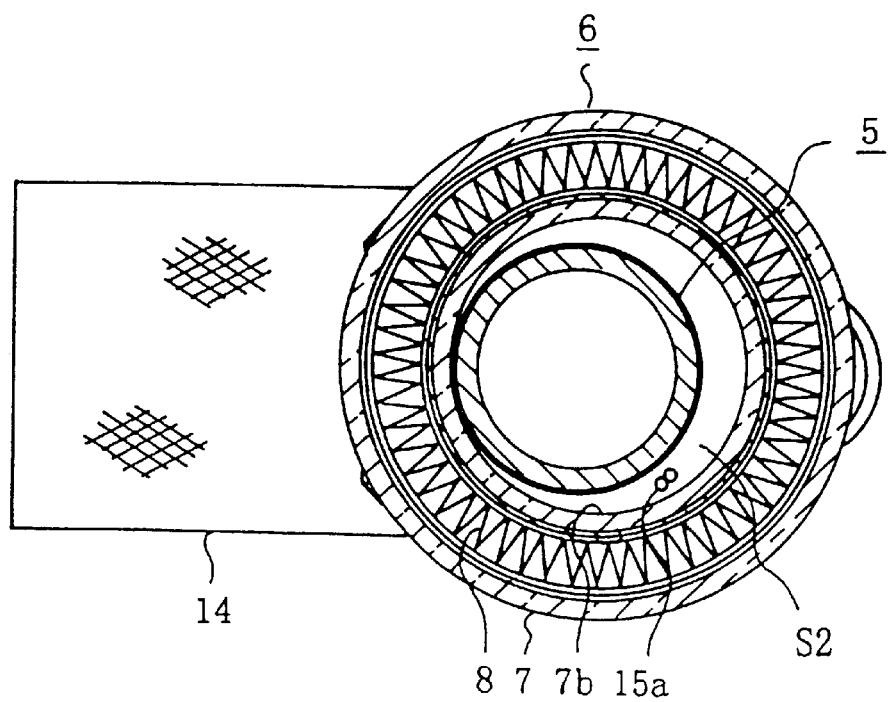
FIG. 3 is a sectional view taken along the line III—III in FIG. 1.

FIG. 1 is a sectional side view of a fuel supply system showing an embodiment of the invention. In the drawing, reference numeral 100 is a fuel supply system, numeral 1 is a fuel tank, and numeral 2 is an opening of the fuel tank 1. Numeral 3 is a flange made of an electrically insulating synthetic resin, and the flange 3 has a lid 3a for covering the opening 2 of the fuel tank 1 and a discharge pipe 3b. Numeral 4 is a gasket for hermetically sealing a space between the fuel tank 1 and the lid 3a in order to prevent leakage of fuel. Numeral 5 is a fuel pump for supplying the fuel to an injector of an internal-combustion engine in a pressurized manner, and the fuel pump 5 has an intake port 5a and a discharge port 5b.

Figure 4:
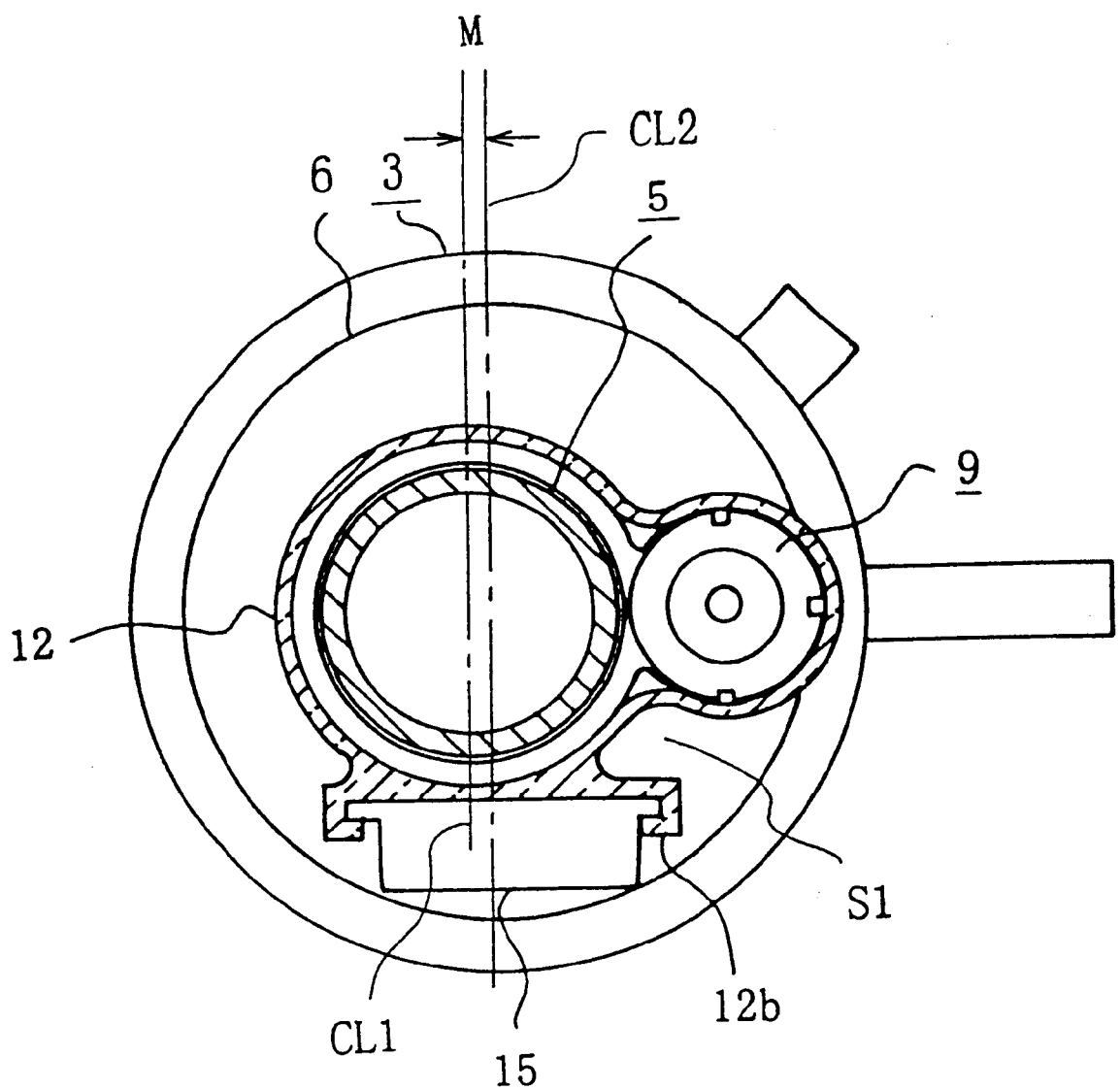
FIG. 4 is a sectional view taken along the line IV—IV in FIG. 1.

Numeral 6 is a fuel filter for filtering the fuel discharged from, the fuel pump 5, and in which a chrysanthemum-shaped filtration element 8 is accommodated in a filter case 7 formed into a hollow cylinder made of a synthetic resin. The filter case 7 has a pump holding hole 7a for holding an outer circumferential portion of the fuel pump 5, a cylindrical inner circumferential wall 7b for accommodating the filtration element 8, and a regulator holding hole 7c for mounting a fuel pressure regulator 9 for regulating the pressure of the fuel discharged from the fuel pump 5. The filtration element 8 is held by a filter holder 8a made of a synthetic resin. As shown in FIGS. 1 and 4, a center line CL1 of the pump holding hole 7a is eccentric with respect to a center line CL2 of the hollow cylindrical filter case 7 by a predetermined distance M. A first enlarged space portion S1 is formed at a part surrounded by an outer circumferential portion of the filter case 7 and an outer circumferential portion of the fuel pump 5. The fuel pressure regulator 9 discharges a surplus of the fuel discharged from the fuel pump 5 as surplus fuel out of a fuel passage into the fuel tank 1 and regulates the pressure of the fuel, and is disposed in the first enlarged space portion S1.

Numeral 10 is a filter cover made of a synthetic resin and provided with a first fuel passage 10a for delivering the fuel discharged from the discharge port 5b of the fuel pump 5 to the fuel filter 6, and a valve hole 10b. A check valve 11 is built in the valve hole 10b. Numeral 12 is a pump holder made of a synthetic resin, and the pump holder 12 holds the fuel pump 5 through a cushion rubber 13. Numeral 14 is an intake filter that is connected to an intake port 12a formed on the pump holder 12 and filters foreign matter such as iron powder when the fuel in the fuel tank 2 is sucked into the fuel pump 5. Numeral 15 is a fuel level gauge. A gauge holding portion 12b is formed on the pump holder 12 utilizing the first enlarged space portion S1, and the fuel level gauge 15 is held by this gauge holding portion 12b. Numeral 16 is a connector by which a lead wire (not shown) for supplying a power to the fuel pump 5 and a lead wire 15a for supplying a power to the fuel level gauge 15 are connected. Numeral 17 is a cut-off valve, and numeral 18 is a breather pipe. These fuel system parts are integrally formed into one body in the form of a pump module, and are suspended at the opening 2 of the fuel tank 1 through the gasket 4.

Operation of the fuel supply system 100 constructed as described above is hereinafter described.

When driving the fuel pump 5, the fuel in the fuel tank 1 is sucked into the fuel pump 5 through the intake filter 14. Thereafter the fuel is discharged from the discharge pipe 5b, flows through the first fuel passage 10a in the direction indicated by the arrow A, and enters between an outside of the filtration element 8 and the filter case 7. The fuel then passes through the filtration element 8 as indicated by the arrow B, whereby dust and the like in the fuel are filtered. Then the filtered fuel flows in the direction indicated by the arrow C, opens the check valve 11 and flows in the direction indicated by the arrow D, and is supplied through the discharge pipe 3b to an injector of a fuel injection system installed in an engine not shown.

In the meantime, a part of the fuel that has flown in between the outside of the filtration element 8 and the filter case 7 flows in the direction indicated by the arrow E, and enters in the fuel pressure regulator 9, where the pressure of the fuel is regulated. Then, the fuel flows in the direction indicated by the arrow F as a surplus fuel and is discharged into the fuel tank 1.

In this Embodiment 1 of above-described construction, the hollow cylindrical fuel filter 6 is used in the filtration element 8, and the center line CL1 of the pump holding hole 7a is eccentric with respect to the center line CL2 of the hollow cylindrical filter case 7 by a predetermined distance M. Therefore, it is possible to form the first enlarged space portion S1 at the part surrounded by the outer circumferential portion of the filter case 7 and the outer circumferential portion of the fuel pump 5, and to accommodate the fuel system parts such as the fuel pressure regulator 9, the fuel level gauge 15, etc. in the first enlarged space portion S1. Consequently, it is not necessary to increase the outer diameter of the fuel supply system 100 and the diameter of the tank hole through which the pump module is inserted in the fuel tank 1, and it is therefore possible to obtain a fuel supply system in which the fuel filter 6 has a large filtration area.

The second enlarged space portion S2 is formed between the cylindrical inner circumferential wall 7b of the filter case 7 and the outer circumferential portion of the fuel pump 5, and the lead wire 15a of the fuel level gauge 15 is accommodated in the second enlarged space portion S2 accommodates. Consequently, it is possible to protect the lead wire 15a by the inner circumferential wall 7b of the filter case 7 made of a synthetic resin, and prevent the lead wire 15a from being damaged at the time of mounting it on the fuel tank 1.

Industrial Applicability

As described above, the fuel supply system according to the invention comprises a fuel pump installed in a fuel tank for raising a pressure of a fuel and supplying the fuel to an injector of an internal-combustion engine, a fuel pressure regulator for discharging a surplus of the fuel discharged from the fuel pump as a surplus fuel from a fuel passage into the fuel tank and regulating the pressure of the fuel, and a fuel filter having a hollow cylindrical filter case in which a filtration element for filtering the fuel discharged from the fuel pump is accommodated, wherein the filter case is provided with a holding hole for holding the fuel pump, a center line of the holding hole is formed eccentric with respect to a center line of the filter case by a predetermined distance, and a first enlarged space portion is formed at a part surrounded by an outer circumferential portion of the fuel pump and an outer circumferential portion of the filter case. As a result, the fuel system parts such as fuel pressure regulator, fuel level gauge or the like are accommodated in the first enlarged space portion, and it is not necessary to increase the outer diameter of the fuel supply system and the outer diameter of the tank hole through which the pump module is inserted in the fuel tank. It is therefore possible to obtain a fuel supply system in which the fuel filter has a large filtration area.

The second enlarged space portion, in which the lead wire of the fuel level gauge is accommodated, is formed between the inner circumferential wall of the filter case and the outer circumferential portion of the fuel pump. Consequently, the lead wire of the fuel level gauge is protected by the filter case and is prevented from being damaged at the time of mounting it on the fuel tank.

What is claimed is:

1. A fuel supply system comprising: a fuel pump installed in a fuel tank for raising a pressure of a fuel and supplying the fuel to an injector of an internal-combustion engine; a fuel pressure regulator for discharging a surplus of the fuel discharged from said fuel pump as a surplus fuel from a fuel passage into said fuel tank and regulating the pressure of the fuel; and a fuel filter having a hollow cylindrical filter case in which a filtration element for filtering the fuel discharged from said fuel pump is accommodated;

wherein said filter case is provided with a holding hole for holding said fuel pump, a center line of said holding hole is formed eccentric with respect to a center line of said filter case by a predetermined distance, and a first enlarged space portion is formed at a part surrounded by an outer circumferential portion of said fuel pump and an outer circumferential portion of said filter case.

2. The fuel supply system according to claim 1, wherein fuel system parts such as fuel pressure regulator are accommodated in the first enlarged space portion.

3. The fuel supply system according to claim 1, wherein a second enlarged space portion for accommodating a lead wire of a fuel level gauge is formed between an inner circumferential wall of the filter case and the outer circumferential portion of the fuel pump.

* * * * *